United States Patent Office 3,100,226
Patented Aug. 6, 1963

3,100,226
2,5-DICHLORO-3 ACYLAMINOBENZOIC ACIDS
Harvey P. Raman, Philadelphia, and Stanley R. McLane, Prospectville, Pa., assignors to Amchem Products, Inc., Ambler, Pa., a corporation of Delaware
No Drawing. Filed Oct. 16, 1959, Ser. No. 846,816
6 Claims. (Cl. 260—518)

This invention relates to new compositions of matter and more particularly relates to new compositions having herbicidal properties.

The compounds of this invention may be described as the N-alkyl, aryl and aryl-alkyl amides of 2,5-dichloro-3-aminobenzoic acids having the following general formula:

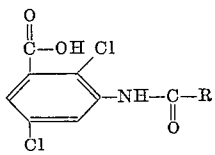

where R is selected from the class consisting of hydrogen, alkyl and halogen substituted alkyl groups containing from 1 to 6 total carbon atoms, phenyl and halogen substituted phenyl groups, alkyl substituted and alkene substituted phenyl groups. Other derivatives which are readily hydrolized by water in soil or plant tissue in addition to the acids or salts, for example the esters, thioesters, anhydrides, thioanhydrides, halides and amides, may be employed if desired, however the acids and salts are preferred.

Several examples of compounds included within the scope of this invention are: N-(2,5-dichloro-3-carboxyphenyl)-formamide, N-(2,5-dichloro-3-carboxyphenyl)-acetamide, N-(2,5-dichloro-3-carboxyphenyl)-propionamide, N-(2,5-dichloro-3-carboxyphenyl)-butyramide, N-(2,5-dichloro-3-carboxyphenyl)-caproamide, N-(2,5-dichloro-3-carboxyphenyl)-alpha-bromopropionamide, N-(2,5-dichloro-3-carboxyphenyl)-cinnamide, N-(2,5-dichloro-3-carboxyphenyl)-hydrocinnamide, N-(2,5-dichloro-3-carboxyphenyl)-benzamide, as well as halogen substituted derivatives thereof.

The compositions of the present invention may in general be prepared by the reaction of the corresponding 2,5-dichloro-3-aminobenzoic acid with the corresponding acid anhydride or with the corresponding acid or acid halide in accordance with the following general formulae:

A. With anhydrides:

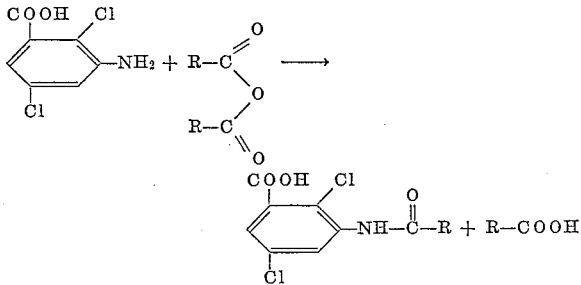

B. With halides:

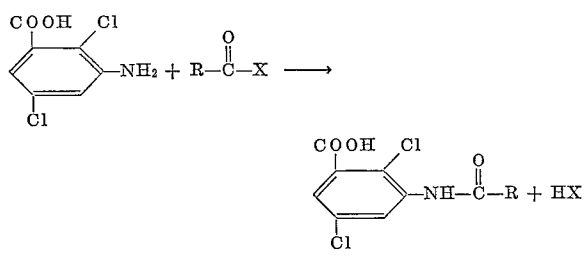

C. With acids:

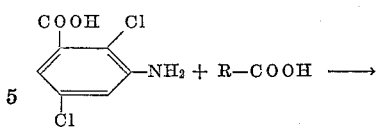

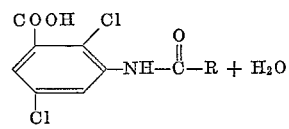

The products of this invention when purified are white crystalline solids which are soluble in alkali, substantially insoluble in water, and soluble in organic solvents such as dimethyl formamide, acetone, and chlorinated hydrocarbons such as ethylene dichloride, etc., acetone and lower alkyl alcohols and ethers. In view of the solubility of these compounds in alkaline solutions, formulations thereof may be made in the form of the alkali metal or amine salts to yield aqueous solutions of the herbicidal composition. The preferred method of formulation of these compounds consists of dissolving or emulsifying the herbicidal agent in commercial agricultural diluents such as is well known in the art. These solutions or emulsions may then be further diluted with oil for application according to practices well established in the art. It is within the purview of this invention to include adjuvants such as wetting agents, sequestering agents and dispersing agents. The formulations may also include other herbicides which complement or synergize the action of these compounds on noxious vegetation.

The compounds of this invention have been observed to possess a high rate of herbicidal activity when used in pre-emergence applications and to possess a highly selective action in post emergence applications when used on certain crops such as snap beans, soybeans, corn and wheat. The selectivity of these compounds is surprising in view of the high activity on pre-emergence tests, and in this respect are superior to many of the known herbicides which fail to give weed control or cause damage to the crops growing in the vicinity of the weeds to be eradicated.

The following examples illustrate methods which have been used for the preparation of the compositions of this invention and are given for the purposes of illustration and are not intended to be a limitation of this disclosure.

EXAMPLE I

*The Preparation of N-(2,5-Dichloro-3-Carboxyphenyl)-Acetamide*

20.6 parts of 2,5-dichloro-3-aminobenzoic acid and 100 parts of acetic anhydride were refluxed at 140° C. for 30 minutes. The solution was then poured into 1000 mls. of distilled water. This mixture was stirred at ambient temperature for 10 to 15 minutes in order to hydrolyze the excess acetic anhydride. After this hydrolyzation stage, sufficient 10% sodium hydroxide solution was added to the aqueous acetic acid solution to obtain a pH of 8–9. The alkaline solution was then acidified with hydrochloric acid to precipitate the product of this reaction. The crude crystals were collected by filtration and after recrystallization, washing and drying analyzed as follows:

Melting point: 215–217° C.
Neutralization equivalent: Calculated 247; found 248.
Chlorine (Parr bomb), percent: Calculated 28.6; found 25.3.
Appearance: White crystalline solid.

EXAMPLE II

*Preparation of N-(2,5-Dichloro-3-Carboxyphenyl)-Propionamide*

20.6 parts of 2,5-dichloro-3-aminobenzoic acid and 100 parts of propionic anhydride were refluxed at 170° C. for 30 minutes. The solution was then poured into 1000 mils. of distilled water. This mixture was stirred at ambient temperature for 10 to 15 minutes in order to hydrolyze the excess propionic anhydride. After this hydrolyzation stage sufficient 10% sodium hydroxide solution was added to the aqueous propionic solution to obtain a pH 8–9. The alkaline solution was then acidified with hydrochloric acid to precipitate the product of this reaction. The crude crystals were collected by filtration and after recrystallization, washing and drying analyzed as follows:

Melting point: 198–200° C.
Neutralization equivalent: Calculated 262; found 259.
Chlorine, percent (Parr bomb): Calculated 27.0; found 25.4.
Appearance: White crystalline solid.

EXAMPLE III

*Preparation of N-(2,5-Dichloro-3-Carboxyphenyl)-α-Chloroacetamide*

20.6 parts of 2,5-dichloro-3-aminobenzoic acid and 12.3 parts of α-chloroacetylchloride and 100 parts of toluene were refluxed at about 110° C. for 2 hours, with the evolution of hydrogen chloride. After cooling, a crude crystalline product precipitated from the solution and was filtered and recrystallized from ethyl alcohol. The purified and dried product analyzed as follows:

Melting point: 215–218° C.
Chlorine, percent (Parr bomb): Calculated 37.8; found 37.2.
Neutralization equivalent: Calculated 282.5; found 280.
Appearance: White crystalline solid.

EXAMPLE IV

*Preparation of N-(2,5-Dichloro-3-Carboxyphenyl)-β-Bromoacetamide*

20.6 parts of 2,5-dichloro-3-aminobenzoic acid were admixed with 200 parts toluene and 20.1 parts of bromoacetylbromide. The mixture was refluxed for 2 hours at 110° C. with evolution of hydrogen bromide. Upon cooling, the crude precipitate from the reaction mixture was filtered, recrystallized from toluene and dried. Analysis of the purified crystals was as follows:

Melting point: 220–222° C.
Neutralization equivalent: Calculated 327; found 327.
Appearance: White crystalline solid.

EXAMPLE V

*Preparation of N-(2,5-Dichloro-3-Carboxyphenyl)-α,α-Dichloroacetamide*

20.6 parts of 2,5-dichloro-3-aminobenzoic acid and 16 parts of α,α-dichloroacetylchloride and 100 parts of toluene were refluxed at 110° C. for 2 hours with the evolution of hydrogen chloride. After cooling, a crude crystalline product precipitated from the solution and was filtered and recrystallized from ethyl alcohol. The purified and dried product analyzed as follows:

Melting point: 221–222° C.
Neutralization equivalent: Calculated 317; found 318.
Chlorine, percent (Parr bomb): Calculated 44.8; found 43.8.
Appearance: White crystaline solid.

EXAMPLE VI

*Preparation of N-(2,5-Dichloro-3-Carboxyphenyl)-Caproamide*

20.6 parts (0.1 mol) of 2,5-dichloro-3-aminobenzoic acid and 16.2 parts (0.1 mol) of caprylyl chloride were dissolved in 300 mls. of toluene and the solution was heated to reflux (about 110° C.) for three hours with the evolution of hydrogen chloride gas. After cooling, a crude crystalline product precipitated from the solution and was filtered and recrystallized from hot toluene. The purified and dried product analyzed as follows:

Melting point: 156–157° C.
Neutralization equivalent: Calculated 331; found 332.
Appearance: White crystalline solid.

EXAMPLE VII

*Preparation of N-(2,5-Dichloro-3-Carboxyphenyl)-Hydrocinnamide*

20.6 parts of 2,5-dichloro-3-aminobenzoic acid (0.1 mol) and 16.8 parts (0.1 mol) of hydrocinnamoyl chloride were added to 800 mls. of toluene and the mixture was heated to reflux at about 110° C. for 3 hours with the evolution of hydrogen chloride. Complete solubility was not realized during the 3 hour reflux period. After cooling, the precipitate material was recovered by filtration and recrystallized from a mixture of water and acetone. Repeated recrystallizations were effected to a constant melting point. The purified and dried product analyzed as follows:

Melting point: 193–195° C.
Neutralization equivalent: Calculated 338; found 337.
Appearance: White crystalline solid.

EXAMPLE VIII

*Preparation of N-(2,5-Dichloro-3-Carboxyphenyl)-α-Bromopropionamide*

20.6 parts of 2,5-dichloro-3-aminobenzoic acid (0.1 mol) and 21.5 parts (0.1 mol) of α-bromopropionyl bromide were dissolved in 400 mls. of toluene and the solution was heated to reflux at about 110° C. for 4 hours with evolution of hydrogen bromide. The reaction mixture was cooled following the 4 hour reflux stage and the precipitated crude product was separated from the solution by filtration and recrystallized from a solvent mixture consisting of toluene and ethyl acetate. The crystals were repeatedly recrystallized to a constant melting point. The purified and dried product analyzed as follows:

Melting point: 236–237° C.
Neutralization equivalent: Calculated 341; found 341.
Appearance: White crystalline solid.

EXAMPLE IX

*Preparation of N-(2,5-Dichloro-3-Carboxyphenyl)-Formamide*

20.6 grams of 2,5-dichloro-3-aminobenzoic acid and 80 mls. of formic acid were mixed and heated to reflux (about 101° C.) for six hours. After the reflux stage the solution was cooled to room temperature and the precipitated product was recovered by filtration and washed with water. Recrystallization was effected from an admixture of acetone and water. The purified and dried product analyzed as follows:

Melting point, °C.=224–225 decomposed.
Neutralization equivalent: Calculated 234; found 234.
Appearance: White crystalline solid.

EXAMPLE X

*Preparation of N-(2,5-Dichloro-3-Carboxyphenyl)-2,5-Dichlorobenzamide*

20.6 parts of 2,5-dichloro-3-aminobenzoic acid and 20.9 parts of 2,5-dichlorobenzoyl chloride were dissolved in 800 mls of toluene and the solution was heated to reflux (about 110° C.) for 3 hours with evolution of hydrogen chloride gas. After cooling, a crude crystalline product precipitated from solution and was recovered by filtration. Recrystallization was effected from hot toluene. The purified and dried product analyzed as follows:

Melting point, ° C.: 278–279.
Neutralization equivalent: Calculated 378.5; found 378.
Appearance: White crystalline solid.

EXAMPLE XI

*Preparation of N-(2,5-Dichloro-3-Carboxyphenyl)-Cinnamide*

20.6 parts of 2,5-dichloro-3-aminobenzoic acid (0.1 mol) and 16.6 parts (0.1 mol) of cinnamoyl chloride were dissolved in 800 mls. of toluene and the solution was heated to reflux (about 110° C.) for four hours with the evolution of hydrogen chloride gas. It was observed that the reaction mixture began to precipitate a solid product and to thicken as the reflux cycle continued. After the reaction cycle, the reaction mixture was cooled to room temperature and the precipitated product was recovered by filtration. The crude crystalline product was recrystallized from acetone. Analysis of the purified and dried product was as follows:

Melting point, ° C.: 230–231.
Neutralization equivalent: Calculated 336.5; found 336.
Appearance: White crystalline solid.

EXAMPLE XII

*Preparation of N-(2,5-Dichloro-3-Carboxyphenyl)-Benzamide*

20.6 parts (0.1 mol) of 2,5-dichloro-3-aminobenzoic acid and 14.0 parts (0.1 mol) of benzoyl chloride were dissolved in 800 mls. of toluene and the solution was heated to reflux for four hours. Complete solubility was obtained and hydrogen chloride gas was evolved during the reaction cycle. After completion of the four hour reaction period, the reaction mixture was cooled to room temperature and the reaction product was recovered by filtration. Recrystallization was effected initially from toluene with successive recrystallizations being effected using isopropyl alcohol and water mixtures. Final recrystallization to constant melting point was effected using acetic acid. Analysis of the purified and dried product as follows:

Melting point, ° C.: 214–216.

Neutralization equivalent: Calculated 310; found 309.
Appearance: White crystalline solid.

What is claimed as the invention is:
1. A compound having the formula:

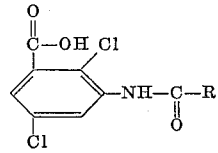

wherein R is a member of the class consisting of hydrogen, alkyl, bromo and chloro substituted alkyl groups containing from 1 to 6 total carbon atoms, and phenyl, halogen substituted phenyl, the halogen being selected from the class consisting of bromo and chloro, 2-phenyl ethyl and 2-phenyl ethenyl groups.

2. The compound of claim 1 wherein R is a methyl group such that the compound is N-(2,5-dichloro-3-carboxyphenyl)-acetamide.

3. The compound of claim 1 wherein R is an alpha-chloromethyl group such that the compound is N-(2,5-dichloro-3-carboxyphenyl)-α-chloroacetamide.

4. The compound of claim 1 wherein R is an alphadichloromethyl group such that the compound is N-(2,5-dichloro-3-carboxyphenyl)-α,α-dichloroacetamide.

5. The compound of claim 1 wherein R is a phenyl group such that the compound is N-(2,5-dichloro-3-carboxyphenyl)-benzamide.

6. The compound of claim 1 wherein R is an ethyl group such that the compound is N-(2,5-dichloro-3-carboxyphenyl)-propionamide.

References Cited in the file of this patent

UNITED STATES PATENTS

| | | |
|---|---|---|
| 2,100,242 | Deese | Nov. 23, 1937 |
| 2,364,054 | Avery | Dec. 5, 1944 |
| 2,705,726 | Archer | Apr. 5, 1955 |
| 2,723,909 | Denny | Nov. 15, 1955 |

OTHER REFERENCES

Beilstein: Organische Chemie, vol. 14, p. 412 (1931). (Copy in Library.)